(12) United States Patent
Yamamoto

(10) Patent No.: US 8,407,375 B2
(45) Date of Patent: Mar. 26, 2013

(54) INFORMATION PROCESSING APPARATUS AND INFORMATION PROCESSING METHOD

(75) Inventor: Katsuhisa Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1135 days.

(21) Appl. No.: 11/680,946

(22) Filed: Mar. 1, 2007

(65) Prior Publication Data

US 2007/0260767 A1    Nov. 8, 2007

(30) Foreign Application Priority Data

Mar. 15, 2006 (JP) ................................. 2006-070542

(51) Int. Cl.
*G06F 3/00* (2006.01)
(52) U.S. Cl. ........................................................ 710/20
(58) Field of Classification Search .................... 345/1.2, 345/204, 547, 102; 710/20
See application file for complete search history.

(56) References Cited

U.S. PATENT DOCUMENTS

| | | | | |
|---|---|---|---|---|
| 2002/0075250 A1* | 6/2002 | Shigeta et al. | ................ | 345/204 |
| 2003/0001856 A1* | 1/2003 | Sawada et al. | ................ | 345/581 |
| 2003/0146897 A1* | 8/2003 | Hunter | ......................... | 345/102 |
| 2005/0046637 A1* | 3/2005 | Mondal | ......................... | 345/547 |
| 2006/0001595 A1* | 1/2006 | Aoki | ............................ | 345/1.2 |

FOREIGN PATENT DOCUMENTS

| | | |
|---|---|---|
| JP | 9-101905 | 4/1997 |
| JP | 10-187279 | 7/1998 |
| JP | 3473446 | 9/2003 |
| JP | 2003-302952 | 10/2003 |
| JP | 2004-163706 | 6/2004 |

* cited by examiner

*Primary Examiner* — Quan-Zhen Wang
*Assistant Examiner* — Tony Davis
(74) *Attorney, Agent, or Firm* — Oblon, Spivak, McClelland, Maier & Neustadt, L.L.P.

(57) ABSTRACT

A disclosed information processing apparatus is equipped with a built-in display unit and a built-in input unit. A display signal supplied from an external information processing apparatus connected to the information processing apparatus is combined with a display signal supplied from a core processing unit in a part of a screen of the display unit displaying the signal supplied from the core processing unit. An input signal received from the input unit is output only to the external information processing apparatus or only to the information processing apparatus depending on whether the part is determined as being activated or inactivated.

12 Claims, 9 Drawing Sheets

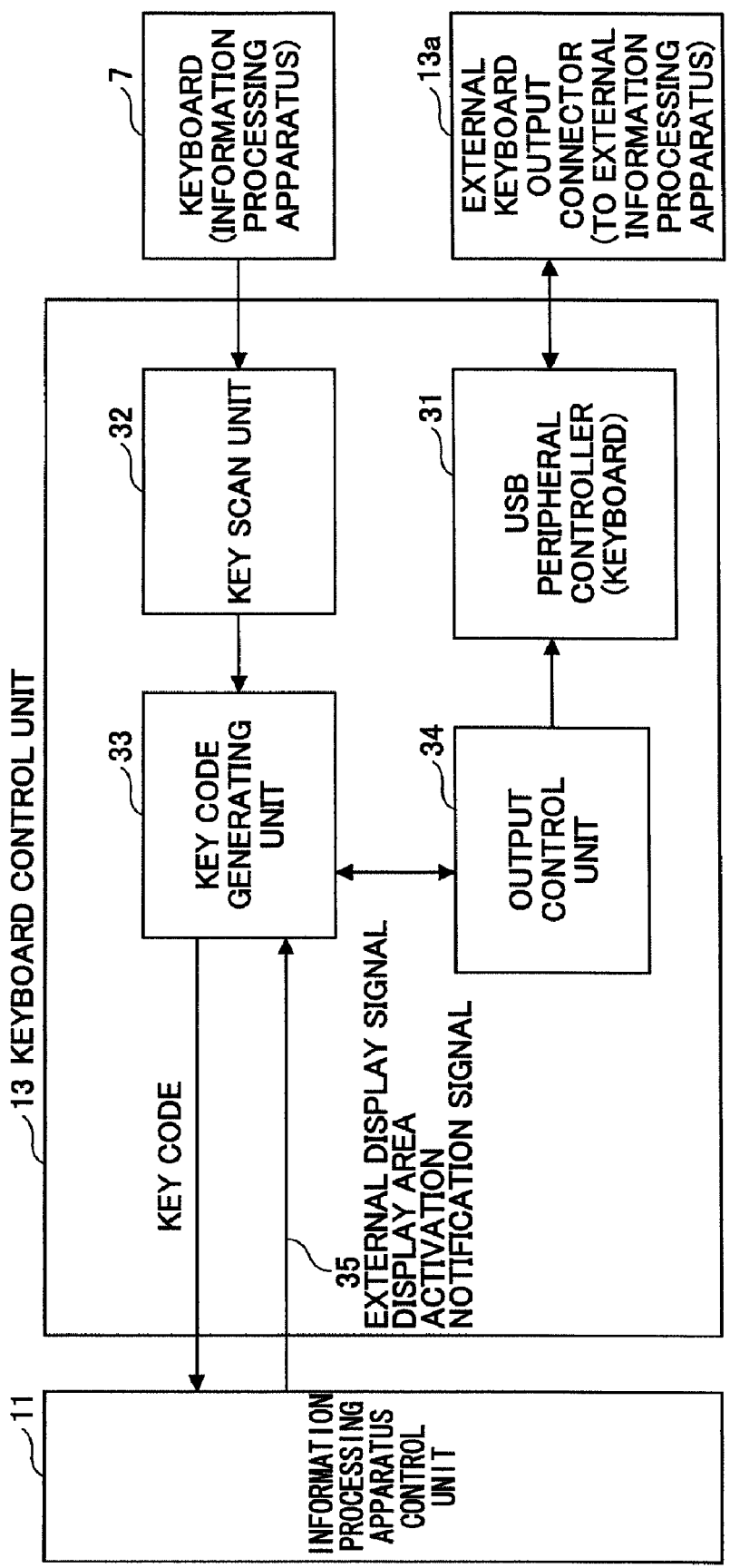

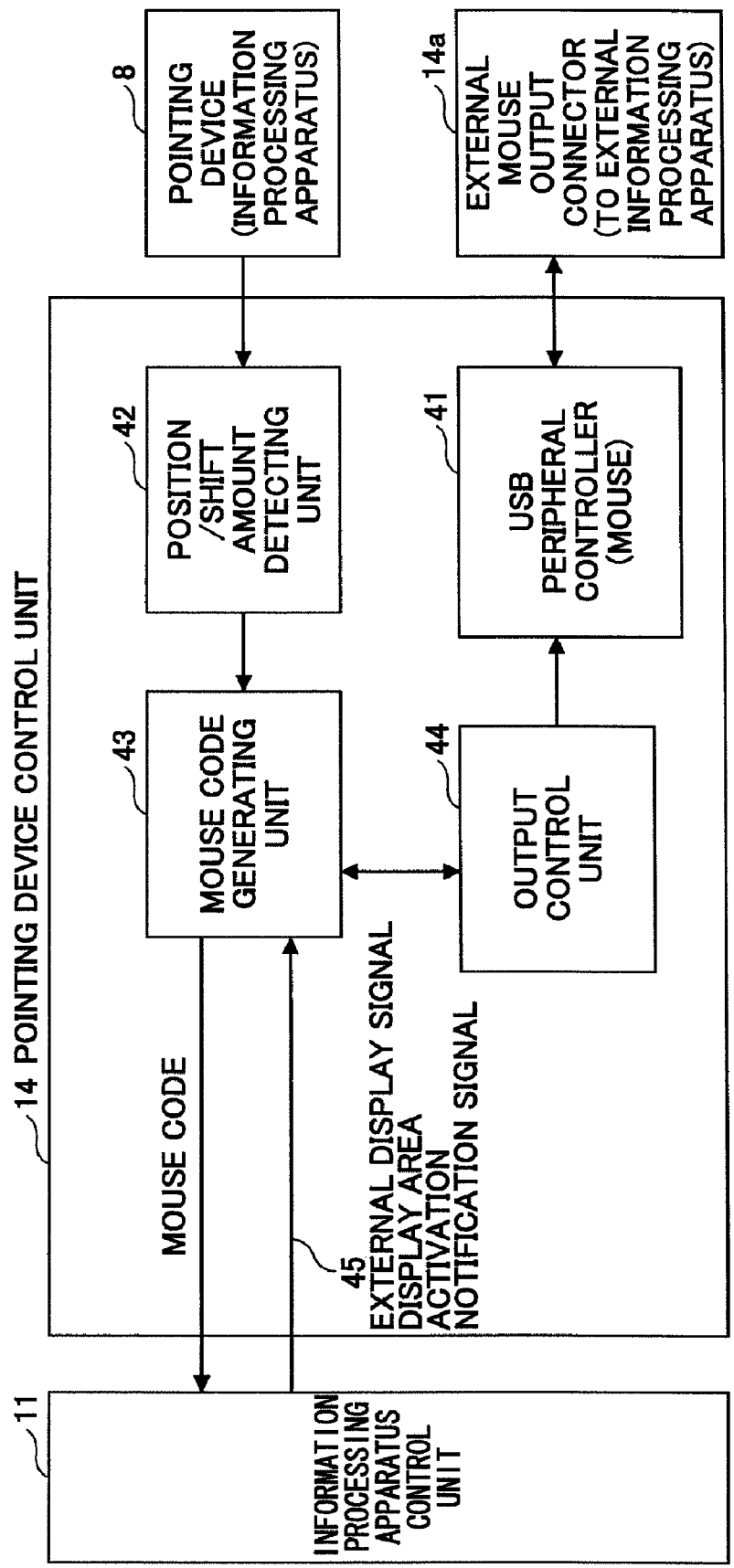

INFORMATION PROCESSING APPARATUS AND INFORMATION PROCESSING METHOD

BACKGROUND OF THE INVENTION

1. Field of the Invention

The present invention relates generally to display units and input units of computers, and more particularly to an information processing apparatus to be used as a display unit and an input unit of another computer, and an information processing method.

2. Description of the Related Art

In recent years and continuing, equipment with built-in computers is being widely used. For example, there are manufacturing devices of industrial products, examination devices, medical devices, and monitor devices that are connected to a computer with a built-in control unit and controlled by the control unit. Unlike typical computers, some of these devices can operate without being connected to display units such as an LCD (Liquid Crystal Display) or a CRT, or to input units for inputting characters and coordinates such as a keyboard or a mouse.

Such a device is often configured with an OS (Operating System) and application software operating on the OS. For purposes such as data back-up, device maintenance, and software updating, the device needs to be connected to a display unit and an input unit. Otherwise, when the device is performing normal operations, neither the display unit nor the input unit is necessary, and therefore, the device does not need to be connected to the display unit or the input unit. Hence, it is uneconomical in terms of space and cost to have the display unit and the input unit connected to the device under such normal operations.

FIG. 8 is an example of a conventional connection configuration. Under normal operations, an external information processing apparatus 1 does not need to be connected to an external display unit 2, an external keyboard 3, or a mouse 4. The external information processing apparatus 1 has a built-in extended input-output unit (not shown) and controls an object device (not shown).

For purposes such as data back-up, device maintenance, and software updating, the external information processing apparatus 1 may be connected to the external display unit 2, the external keyboard 3, and the mouse 4. Another information processing apparatus 5 may be operated near the external information processing apparatus 1 for transferring the data to be backed up or for storing the software to be updated.

A display unit 6 of the information processing apparatus 5 can be used as the display unit of the external information processing apparatus 1, instead of the external display unit 2. However, the information processing apparatus 5 is only used as a display unit, and therefore, the external keyboard 3 and the mouse 4 also need to be connected to the external information processing apparatus 1. If such peripherals are permanently connected to the external information processing apparatus 1 for purposes such as data back-up, device maintenance, and software updating, additional costs and spaces are required and the total installation area including the external information processing apparatus 1 becomes considerably large.

FIG. 9 is a block diagram of an internal configuration of the conventional information processing apparatus 5 (in this example, a laptop computer). An information processing apparatus control unit 11 (core processing unit) shown in FIG. 9 configures the basic structure of the information processing apparatus 5, including various input output control units such as a CPU, a memory, and a network, a storage unit and a power source unit for supplying power to these units. The information processing apparatus control unit 11 processes information exchanged between input output control units including a display control unit 12, a keyboard control unit 13, and a pointing device control unit 14, by executing a program stored therein. The configuration of the information processing apparatus control unit 11 (core processing unit) is the same in the conventional technology and in an embodiment of the present invention.

The display unit 6 is controlled by the display control unit 12. The display control unit 12 has functions of outputting a display signal to an external display unit output connector 12a, and displaying on the display unit 6 display signals of an external apparatus received via an external display signal input connector 9. Furthermore, the information processing apparatus 5 includes an external keyboard input connector 13b and an external mouse input connector 14b so that the external keyboard 3 and the mouse 4 can be connected and used instead of a keyboard 7 or a pointing device 8 that are built in the information processing apparatus 5. However, the keyboard 7 and the pointing device 8 of the information processing apparatus 5 cannot be used as peripherals of the external information processing apparatus 1.

Other than the above configuration, there is a conventional switching unit widely used in a system where a set of a display unit and an input unit (keyboard/mouse, etc.) is provided for plural computers, and the switching unit switches the object computer for which the set is to be used among the plural computers. The switching unit is useful for one operator to operate plural computers. However, effects of the switching unit cannot be appreciated when only one computer is operated. Furthermore, because the set of the display unit and the input unit is initially provided, it is uneconomical in terms of space and cost when an apparatus does not require a display unit or an input unit under normal operations.

Patent Document 1 discloses a method of displaying display signals from an external computer on a display unit built into another computer. However, the method disclosed in Patent Document 1 is limited to using the built-in display unit as a display unit of the external computer; the computer with the built-in display unit cannot serve as an input unit for another computer.

Patent Document 2 discloses a unit to input display signals of one information processing terminal to be combined with display signals of another information processing terminal and displayed on a display unit of the other information processing terminal. However, the application of the technology disclosed in Patent Document 2 is limited to display units as in the case of Patent Document 1. An input unit needs to be provided for each information processing terminal, which input unit is either connected to or built in the information processing terminal. Therefore, the user needs to take the trouble of operating both input units, which is not necessarily convenient.

Patent Document 1: Japanese Patent No. 3473446
Patent Document 2: Japanese Laid-Open Patent Application No. 2004-163706

Portable computers such as laptop computers have built-in display units and built-in input units such as the keyboard/mouse (pointing device, etc.), and can be conveniently carried wherever the user desires. However, the built-in display unit and the built-in input unit can only serve for the portable computer in which they are installed.

SUMMARY OF THE INVENTION

The present invention provides an information processing apparatus and an information processing method in which one or more of the above-described disadvantages are eliminated.

A preferred embodiment of the present invention provides an information processing apparatus and an information processing method by which a display unit and an input unit such as a keyboard/pointing device installed in a portable computer such as a laptop computer can serve as a display unit and an input unit of another computer.

An embodiment of the present invention provides an information processing apparatus including a core processing unit; a built-in display unit configured to display a display signal supplied from the core processing unit; a built-in input unit configured to generate an input signal responsive to a user operation for provision to the core processing unit; a display signal input unit configured to receive a display signal from an external information processing apparatus for provision to the display unit; and an input signal output unit configured to output the input signal received from the input unit to the external information processing apparatus; wherein the display signal and the input signal are exchanged with the external information processing apparatus via the display signal input unit and the input signal output unit.

An embodiment of the present invention provides an information processing method performed by an information processing apparatus equipped with a built-in display unit and a built-in input unit, the method including the steps of (a) combining a display signal supplied from an external information processing apparatus connected to the information processing apparatus with a display signal supplied from a core processing unit in a part of a screen of the display unit displaying the signal supplied from the core processing unit; and (b) outputting an input signal received from the input unit only to the external information processing apparatus or only to the information processing apparatus depending on whether the part is determined as being activated or inactivated.

According to one embodiment of the present invention, a display unit (LCD, etc.) and an input unit (keyboard, mouse, pointing device, etc.) installed in a portable computer can serve as a display unit and an input unit of another computer system. Therefore, economic burdens are reduced if an installed apparatus does not require a permanent display unit or permanent input unit, and convenience is enhanced for the user in terms of maintenance.

BRIEF DESCRIPTION OF THE DRAWINGS

Other objects, features and advantages of the present invention will become more apparent from the following detailed description when read in conjunction with the accompanying drawings, in which:

FIG. 4 is a detailed schematic diagram of a keyboard control unit inside the information processing apparatus according to an embodiment of the present invention;

FIG. 5 is a detailed schematic diagram of a pointing device control unit inside the information processing apparatus according to an embodiment of the present invention;

DETAILED DESCRIPTION OF THE PREFERRED EMBODIMENTS

A description is given, with reference to the accompanying drawings, of an embodiment of the present invention.

Figure 1:
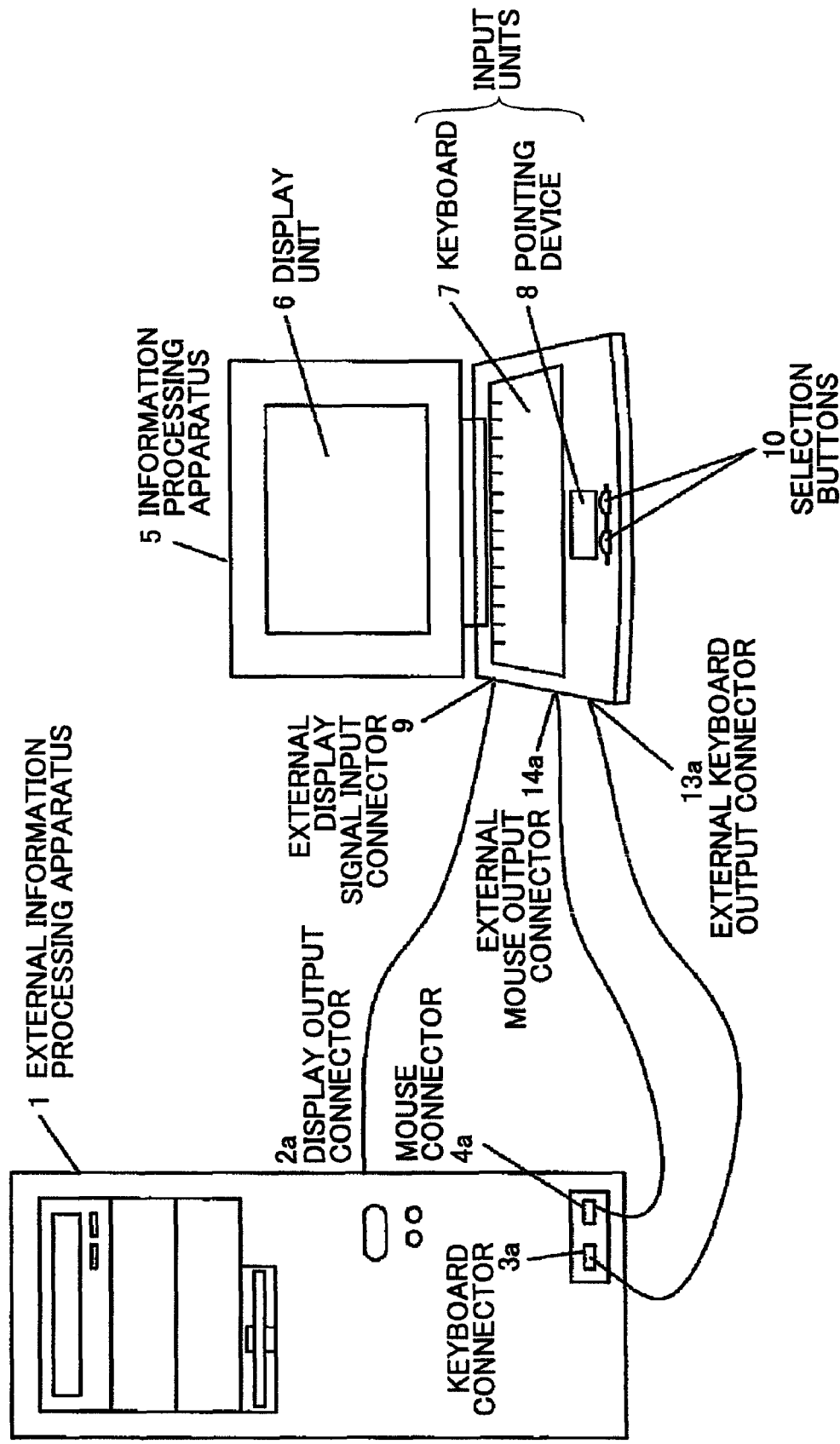
FIG. 1 illustrates a connection configuration of an information processing apparatus according to an embodiment of the present invention.
Figure 2:
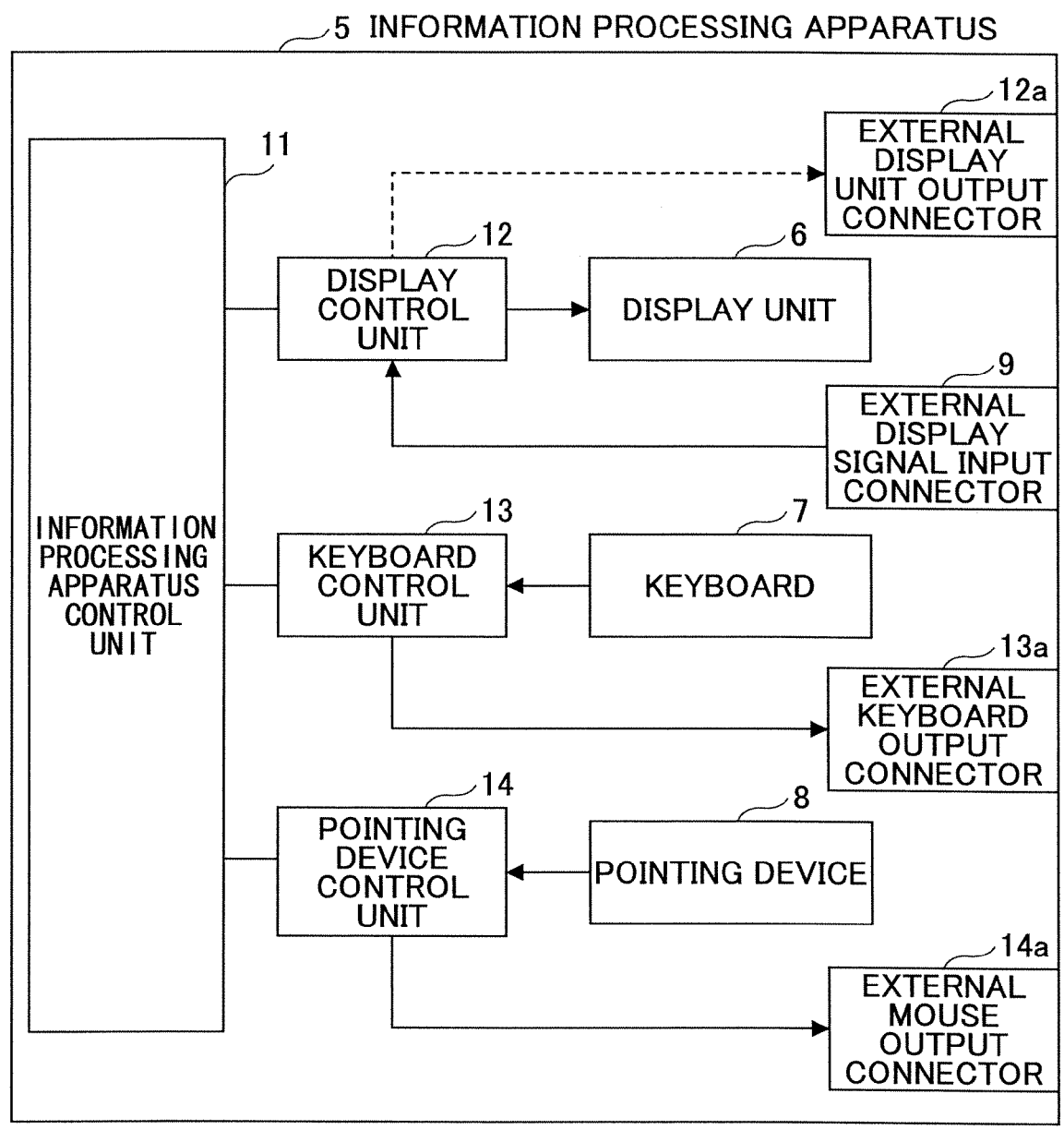
FIG. 2 is a block diagram of an internal configuration of the information processing apparatus according to an embodiment of the present invention.
Figure 8:
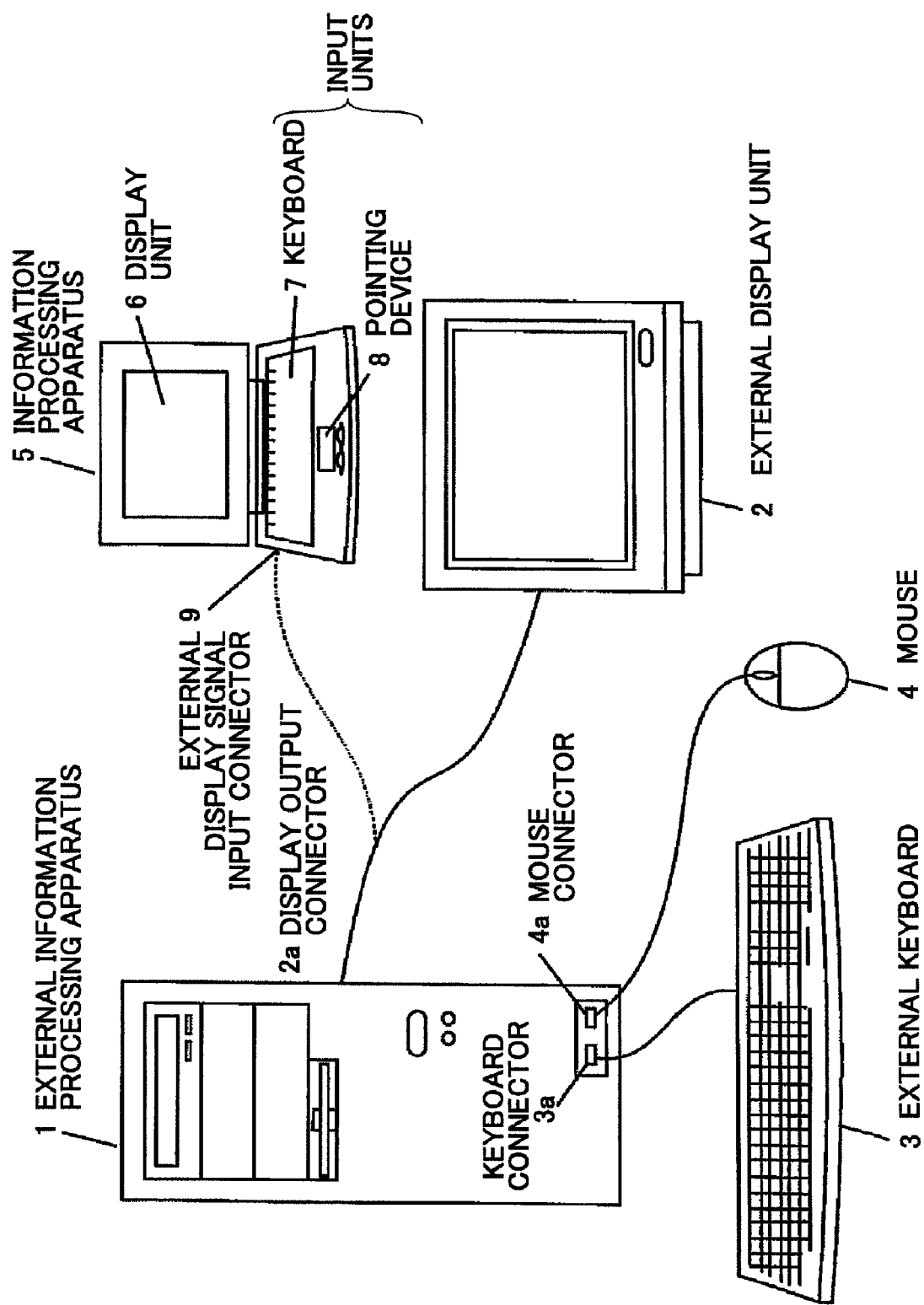
FIG. 8 is an example of a connection configuration of a conventional information processing apparatus.
Figure 9:
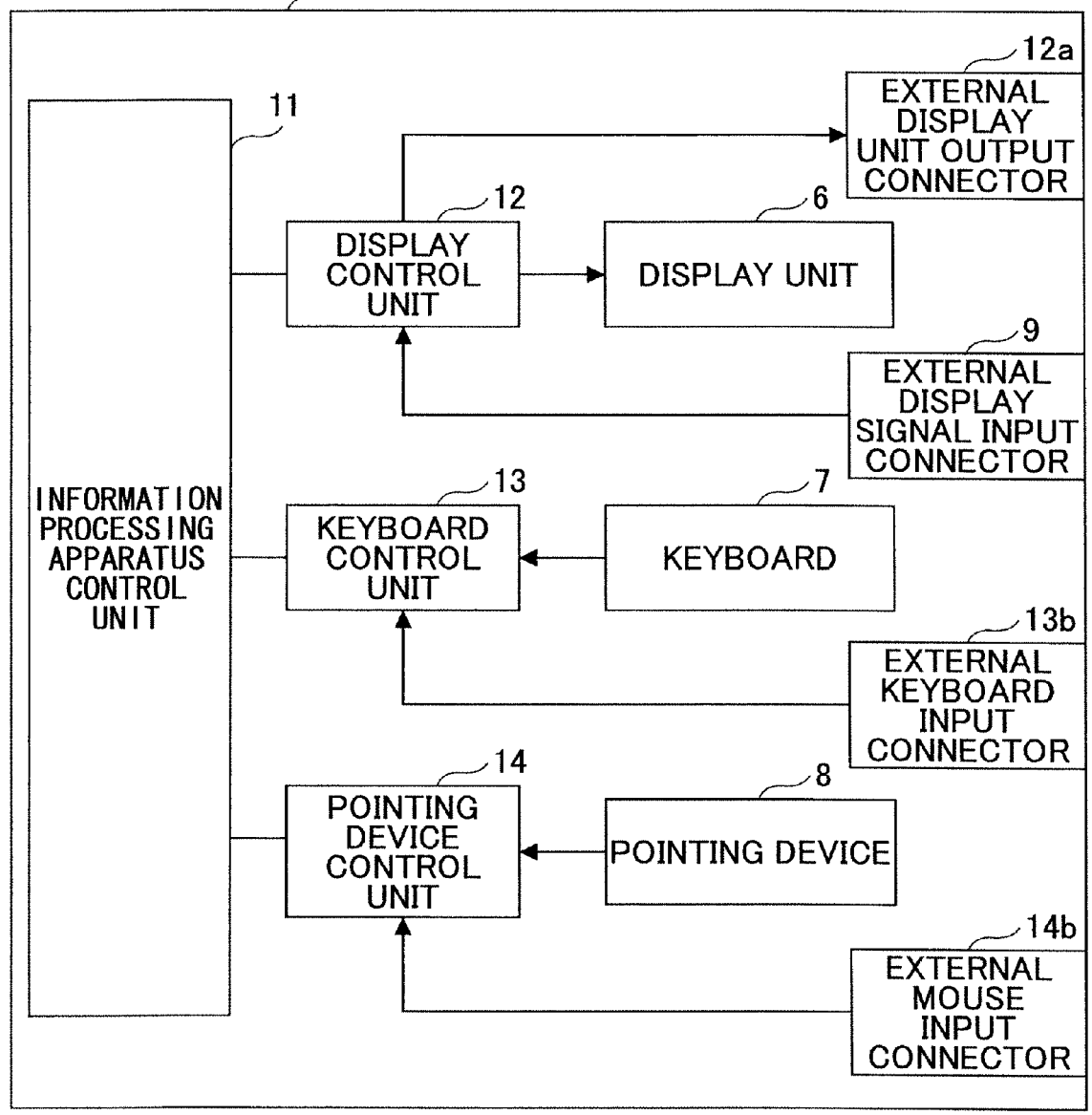
FIG. 9 is a block diagram of an internal configuration of the conventional information processing apparatus.

FIG. 1 illustrates a connection configuration of an information processing apparatus according to an embodiment of the present invention. FIG. 2 is a block diagram of an internal configuration of the information processing apparatus according to an embodiment of the present invention. In FIGS. 1 and 2, elements corresponding to and having practically the same functions as those in FIGS. 8 and 9 describing the conventional technology are denoted by the same reference numbers.

As shown in FIGS. 1 and 2, a display output connector $2a$ of an external information processing apparatus 1 and an external display signal input connector 9 of an information processing apparatus 5 are connected with a cable. Display signals of the external information processing apparatus 1 are input to a display control unit 12 of the information processing apparatus 5, combined with display data input from an information processing apparatus control unit 11 (core processing unit) of the information processing apparatus 5, and displayed on a display unit 6.

A keyboard connector $3a$ of the external information processing apparatus 1 and an external keyboard output connector $13a$ of the information processing apparatus 5 are connected with a cable. Character input signals from a keyboard 7 of the information processing apparatus 5 are input to a keyboard control unit 13. The keyboard control unit 13 generates external outputting signals from the character input signals and outputs them as keyboard data to the external information processing apparatus 1.

A mouse connector $4a$ of the external information processing apparatus 1 and an external mouse output connector $14a$ of the information processing apparatus 5 are connected with a cable. Coordinate input signals from a pointing device 8 of the information processing apparatus 5 are input to a pointing device control unit 14. The pointing device control unit 14 generates external outputting signals from the coordinate input signals and outputs them as coordinate data, as in the case of a mouse, to the external information processing apparatus 1.

Selection buttons 10 are pushed to perform a process at a position on a screen indicated by a pointer after the pointer is moved to the position by operating the pointing device 8.

Figure 3:
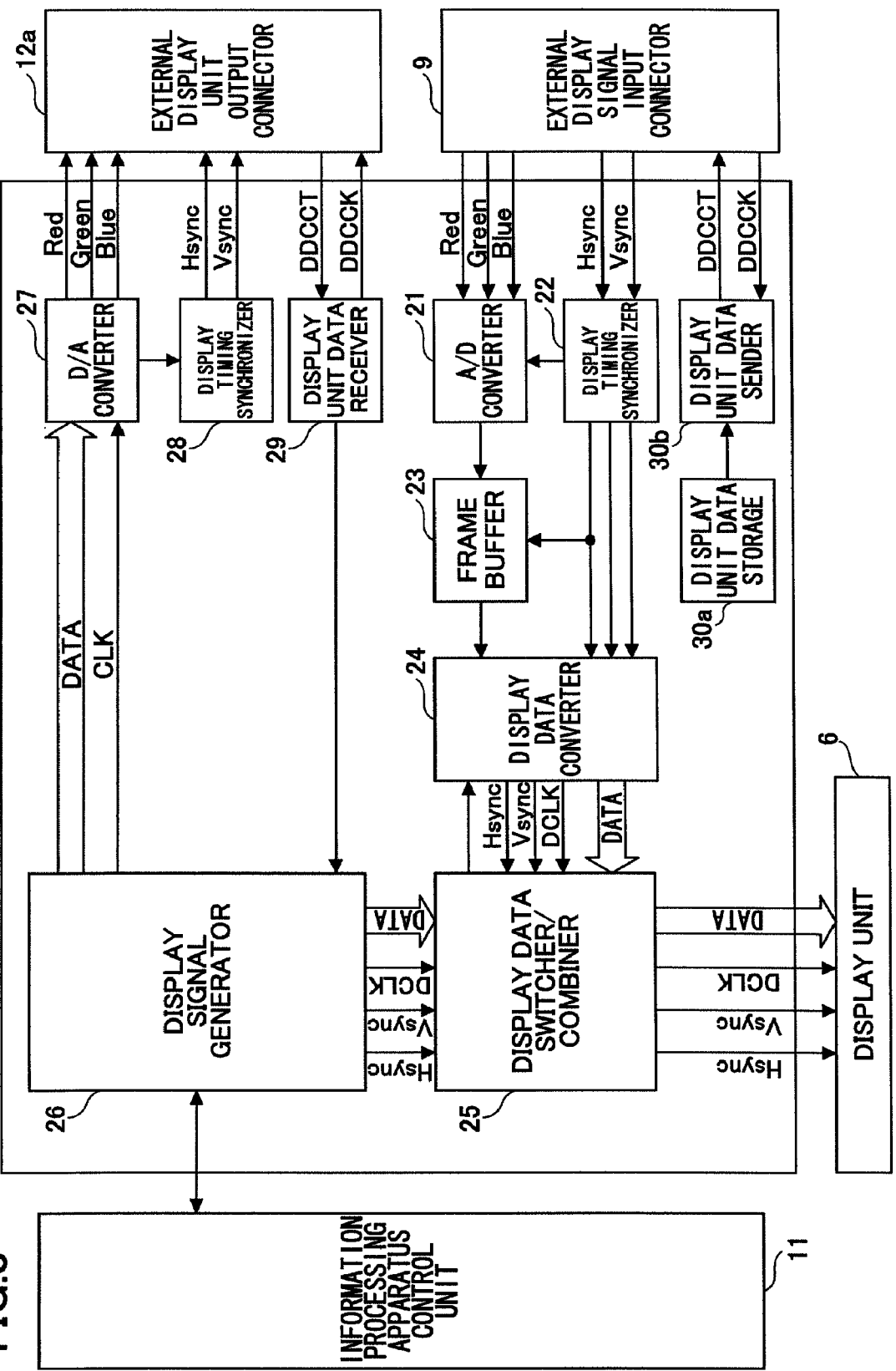
FIG. 3 is a detailed schematic diagram of a display control unit inside the information processing apparatus according to an embodiment of the present invention.

FIG. 3 is a detailed schematic diagram of the display control unit 12 inside the information processing apparatus 5. Among display signals input from the external display signal input connector 9 (in this example, analog RGB signals (Red/Green/Blue), horizontal synchronization signals (Hsync), and vertical synchronization signals (Vsync)), analog RGB signals are input to an A/D converter 21. Hsync signals and Vsync signals are input to a display timing synchronizer 22. The display timing synchronizer 22 includes inside a source and a PLL circuit (not shown), generates timing signals to be output to the A/D converter 21, and outputs synchronization signals to a display data converter 24. Display data digitalized at the A/D converter 21 is loaded in a frame buffer 23 according to synchronization signals for each scanning screen. The display data converter 24 converts the resolution of a scanning screen received from the frame buffer 23, so that the scanning screen is converted to a size displayable on part of the display unit 6 of the information processing apparatus 5. At a display data switcher/combiner 25, the converted display data is combined with display screen data of the information processing apparatus 5 input via a display signal generator 26 from the information processing apparatus control unit 11, and the combined data is output to the display unit 6. As a result, a display screen of the external information processing apparatus 1 is combined with and displayed in a part of a display screen of the information processing apparatus 5.

In a display unit data storage 30*a* shown in FIG. 3, data pertaining to the resolution of the display unit 6 of the information processing apparatus 5 and display timings are previously stored. According to reading operations input from the external information processing apparatus 1, the data is sent out from the display unit data storage 30*a* via a display unit data sender 30*b*. This is a commonly known technology standardized by the VESA (Video Electronics Standards Association). This technology is advantageous in that display signals output from the external information processing apparatus 1 can be appropriately output according to the display timings of the information processing apparatus 5; however, this function is not a prerequisite in the present invention. A D/A converter 27, a display timing synchronizer 28, a display unit data receiver 29, and an external display unit output connector 12*a* are not directly related to operations of the present invention; these components are optional but not mandatory, and therefore, detailed descriptions thereof are omitted.

FIG. 4 is a detailed schematic diagram of the keyboard control unit 13 inside the information processing apparatus 5. In this example, the keyboard connector 3*a* of the external information processing apparatus 1 shown in FIG. 1 is a USB standard connector. By using a standardized USB interface, a device can be connected by hot plugging, and the device can be automatically recognized and configured, so that the device can be connected without turning off the power of the external information processing apparatus 1. Therefore, operability and convenience are improved.

When the external keyboard output connector 13*a* is connected to the keyboard connector 3*a* of the external information processing apparatus 1, a USB peripheral controller 31 communicates with a host controller, and the connection is enabled. The keyboard 7 of the information processing apparatus 5 is connected to a key scan unit 32, and the key scan unit 32 detects whether a key has been depressed. Detected keyboard data is input to a key code generating unit 33, and a key code corresponding to the depressed key is generated. The key code is sent to the information processing apparatus control unit 11 to be processed as keyboard data of the information processing apparatus 5, and is also output to an output control unit 34. The output control unit 34 determines whether to send data to the USB peripheral controller 31 according to an external display signal display area activation notification signal 35 from the information processing apparatus control unit 11, to be described below. That is, when the external display signal display area activation notification signal 35 is "true", the output control unit 34 sends keyboard data to the information processing apparatus control unit 11; when the external display signal display area activation notification signal 35 is "false", the output control unit 34 does not send keyboard data to the information processing apparatus control unit 11. Accordingly, a single keyboard can be used to receive input for either the information processing apparatus 5 or the external information processing apparatus 1.

FIG. 5 is a detailed schematic diagram of the pointing device control unit 14 inside the information processing apparatus 5. As described above, the mouse connector 4*a* of the external information processing apparatus 1 shown in FIG. 1 is a USB standard connector. The pointing device 8 of the information processing apparatus 5 is connected to a position/shift amount detecting unit 42, and the position/shift amount detecting unit 42 detects the position and the shift amount of the pointer as the user operates the pointing device 8 (such as sliding his finger in a two-dimensional direction along the pointing device 8). The detected position/shift amount information is sent to a mouse code generating unit 43, and is converted to a mouse code similar to the case of operating a mouse. The mouse code is sent to the information processing apparatus control unit 11 to be processed as mouse data of the information processing apparatus 5, and is also output to an output control unit 44. The output control unit 44 determines whether to send data to a USB peripheral controller 41 according to an external display signal display area activation notification signal 45 from the information processing apparatus control unit 11, to be described below.

In FIGS. 4 and 5, the external display signal display area activation notification signals 35 and 45 are denoted by different reference numerals as a matter of convenience; however, they can be the same signals (or commands).

Figure 6A:
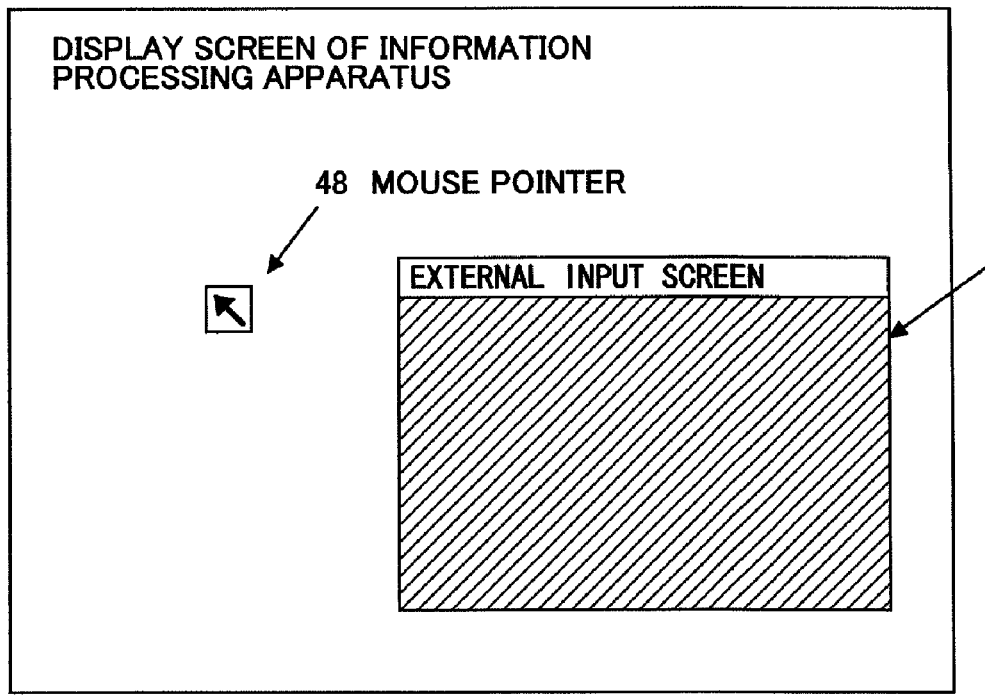
FIGS. 6A and 6B are examples of screens displayed by the information processing apparatus according to an embodiment of the present invention, where the display screen of the information processing apparatus is activated in FIG. 6A and the display screen of the external information processing apparatus is activated in FIG. 6B.
Figure 6B:
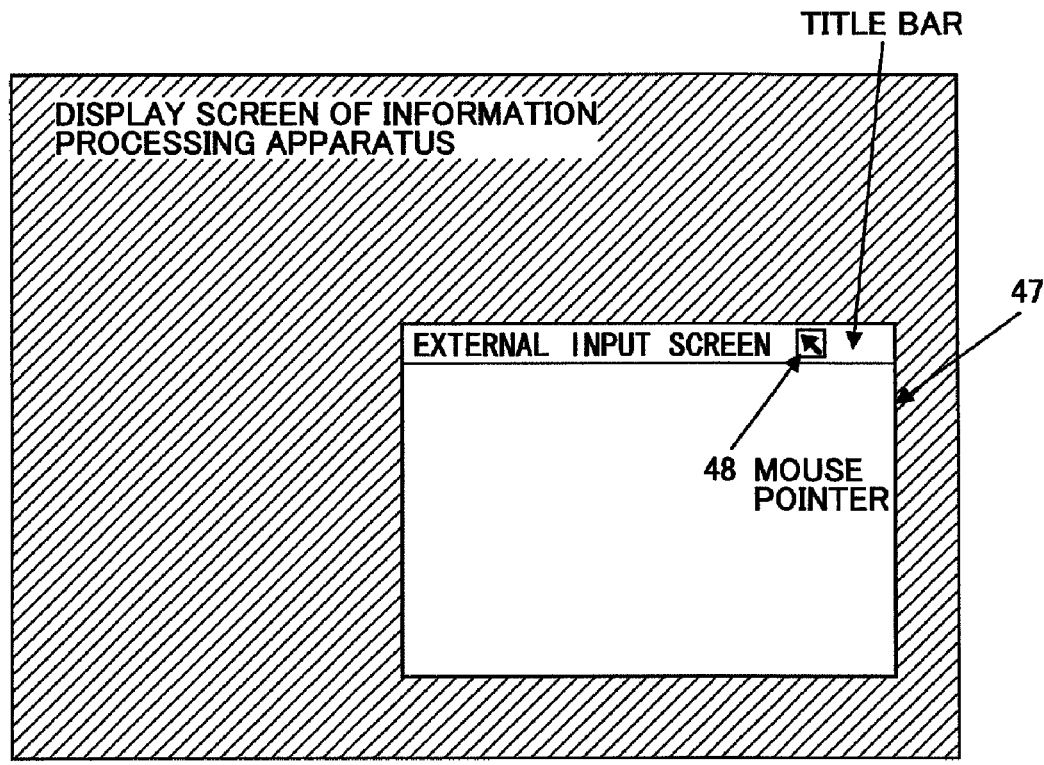

FIGS. 6A and 6B describe an example of a method for determining whether a display area of the external information processing apparatus 1 is activated or inactivated. A screen display of the external information processing apparatus 1 is combined with and displayed in part of the display screen of the information processing apparatus 5 shown in FIGS. 6A and 6B.

FIG. 6A is a screen of the display unit 6 of the information processing apparatus 5. In part of the display screen, an external input screen 47 is displayed in a window (in an inactivated area: shaded area). A mouse pointer 48 is outside the area of the external input screen 47. Therefore, data of the keyboard 7 and the pointing device 8 is only sent to the information processing apparatus control unit 11 shown in FIGS. 4 and 5.

In FIG. 6B, the mouse pointer 48 is inside the window title bar area of the external input screen 47. In this status, the left button, for example, is pressed among the two selection buttons 10 positioned in front of the pointing device 8 of the information processing apparatus 5 as shown in FIG. 1. Accordingly, the window of the external input screen 47 becomes activated (the other areas of the display screen become inactivated: shaded area). In this status, data of the keyboard 7 and the pointing device 8 is not sent to the information processing apparatus control unit 11 shown in FIGS. 4 and 5, but is only sent to the external information processing apparatus 1.

Figure 7:
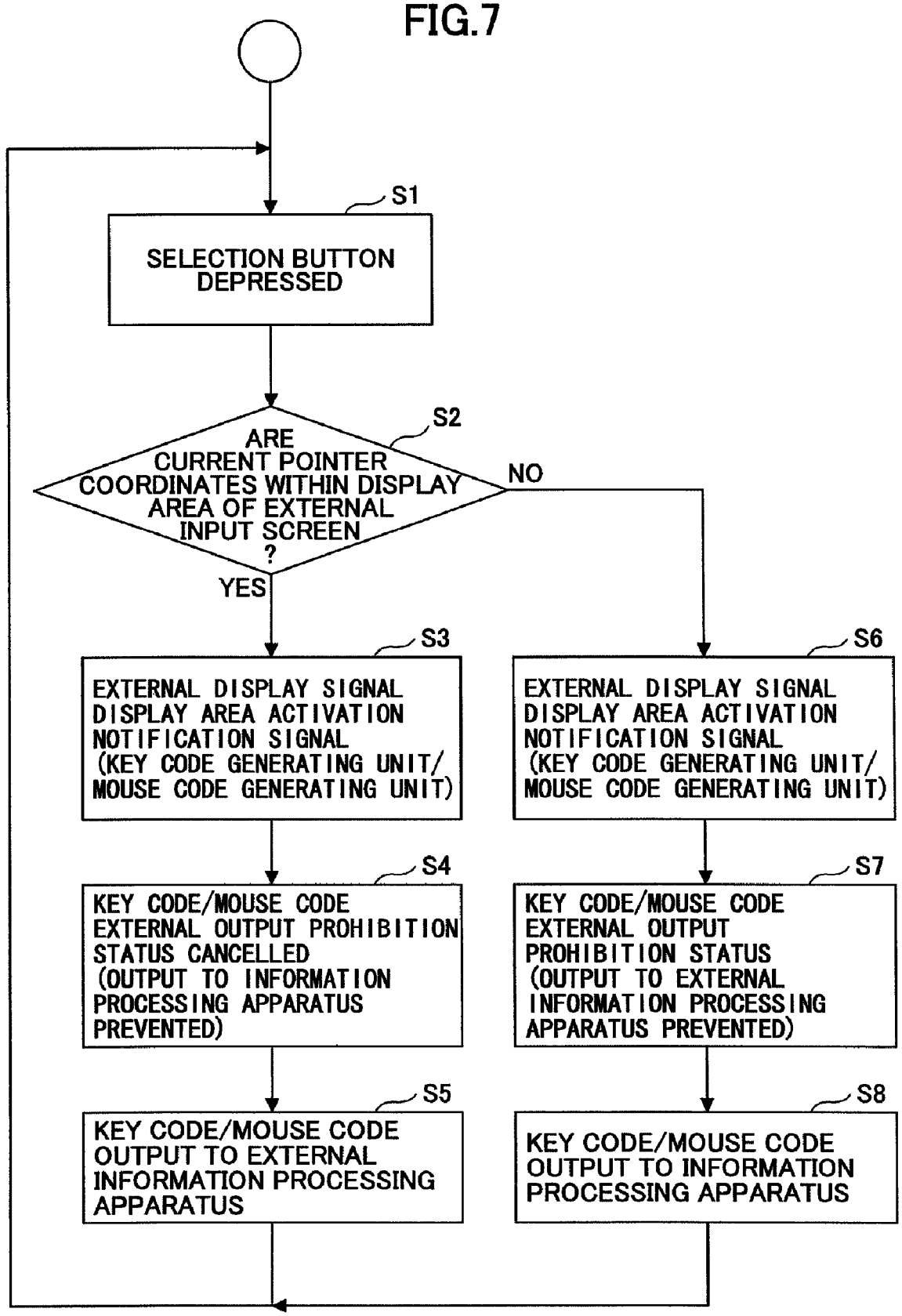
FIG. 7 is a flowchart of a process according to an embodiment of the present invention for determining whether a display area of an external input screen is activated or inactivated.

FIG. 7 is a flowchart of a process for determining whether the display area of the external input screen 47 is activated or inactivated. The process is described based on FIG. 7 and also with reference to FIGS. 1, 4-6B.

When the position/shift amount detecting unit 42 shown in FIG. 5 detects that the position of coordinate data of the pointing device 8 has shifted, the mouse code generating unit 43 generates a mouse code. The mouse code is sent to the information processing apparatus control unit 11 to be processed as a mouse code of the information processing apparatus 5. The mouse code is sent to the information processing apparatus control unit 11 every time the position/shift amount detecting unit 42 detects that the position of coordinate data has shifted due to operation of the pointing device 8.

Referring to FIG. 7, when one of the selection buttons 10 (see FIG. 1) is depressed after a waiting status (step S1), it is determined whether the current pointer coordinates are within the display area of the external input screen 47. If the current pointer coordinates are within the display area of the external input screen 47 as shown in FIG. 6B (Yes in step S2), the external display signal display area activation notification signal 35 (see FIG. 4) and the external display signal display area activation notification signal 45 (see FIG. 5) from the information processing apparatus control unit 11 are sent to the key code generating unit 33 and the mouse code generating unit 43, respectively (step S3). An external output prohibition status of key codes and mouse codes is cancelled, and mouse data is output to the external information processing apparatus 1. At the same time, output to the information processing apparatus 5 is prevented (step S4). Until the next time that one of the selection buttons 10 is pressed, key codes/mouse codes are output to the external information processing apparatus 1 (step S5).

In this example of the process, data of the keyboard/mouse is output to the external information processing apparatus 1 only when one of the selection buttons 10 of the pointing device 8 is pressed when the pointer coordinates are within the display area of the external input screen 47 as shown in FIG. 6B. When one of the selection buttons 10 of the pointing device 8 is pressed when the pointer coordinates are outside the display area of the external input screen 47, key codes/mouse codes are prevented from being output outside (i.e., key codes/mouse codes are output to the information processing apparatus 5).

In step S2 shown in FIG. 7, when the pointer coordinates are outside the display area of the external input screen 47 (No in step S2), the external display signal display area activation notification signal 35 (see FIG. 4) and the external display signal display area activation notification signal 45 (see FIG. 5) from the information processing apparatus control unit 11 are sent to the key code generating unit 33 and the mouse code generating unit 43, respectively (step S6). Key codes and mouse codes are prevented from being output outside. The key codes and mouse codes are output to the information processing apparatus control unit 11, and output to the external information processing apparatus 1 is prevented (step S7). Until the next time that one of the selection buttons 10 is pressed, key codes/mouse codes are output to the information processing apparatus 5 (step S7).

As described above, the display unit and the input unit of the information processing apparatus 5 can serve as the display unit and the input unit of the external information processing apparatus 1. Therefore, economic burdens are reduced if an installed apparatus does not require a permanent display unit or permanent input unit, and convenience is enhanced for the user in terms of maintenance.

The keyboard connector 3a and the mouse connector 4a of the external information processing apparatus 1 respectively connected to the external keyboard output connector 13a and the external mouse output connector 14a of the information processing apparatus 5 can be physically configured as one connector, so that connections of cables can be simplified.

The present invention is not limited to the specifically disclosed embodiment, and variations and modifications may be made without departing from the scope of the present invention.

The present application is based on Japanese Priority Patent Application No. 2006-070542, filed on Mar. 15, 2006, the entire contents of which are hereby incorporated by reference.

What is claimed is:

1. An information processing system comprising an external information processing apparatus and an information processing apparatus, the external information processing apparatus including a display signal output device which outputs a display signal, the information processing apparatus including:

a core processing unit;

a built-in display unit configured to display a display signal supplied from the core processing unit;

a built-in input unit configured to generate an input signal responsive to a user operation for provision to the core processing unit;

a display signal input unit configured to receive the display signal from the display signal output device of the external information processing apparatus for provision to the display unit; and an output unit configured to selectively output the input signal received from the built-in input unit to the external information processing apparatus and to the information processing apparatus;

wherein the display signal received from the external information processing apparatus is combined with the display signal supplied from the core processing unit and displayed in a part of a screen of the display unit displaying the signal supplied from the core processing unit, the information processing apparatus further comprising:

a determining unit configured to determine whether the part of the screen of the display unit of the information processing apparatus displaying the display signal received from the external information processing apparatus is activated or inactivated, wherein the core processing unit causes the output unit to output the input signal received from the input unit only to the external information processing apparatus in response to the determining unit determining that the part of the screen is activated.

2. The information processing system apparatus according to claim 1, wherein the input unit of the information processing apparatus is connected to the external information processing apparatus and operates as a USB standard input device of the external information processing apparatus.

3. The information processing system according to claim 1, wherein:

the built-in input unit comprises a single keyboard which is an only keyboard of the information processing apparatus and the external information processing apparatus.

4. The information processing system according to claim 1, wherein:

the built-in display unit and the built-in input unit are used by the external information processing apparatus and the external information processing apparatus operates without a separate permanent display, and without a separate and permanent input unit.

5. An information processing method performed by an information processing apparatus equipped with a built-in display unit and a built-in controller including an input unit and an output unit which selectively outputs to an external information processing apparatus and the information processing apparatus, the method comprising the steps of:

(a) combining a display signal supplied from the external information processing apparatus connected to the information processing apparatus with a display signal supplied from a core processing unit in a part of a screen of the display unit displaying the signal supplied from the core processing unit; (b) determining whether the part of the screen of the display unit of the information processing apparatus displaying the display signal received from the external information processing apparatus is activated or inactivated; and (c) outputting, using the controller, an input signal received from the input unit only to the external information processing apparatus in response to determining that the part of the screen is activated, or only to the information processing apparatus in response to determining that the part of the screen is inactivated.

6. The information processing method according to claim 5, further comprising:

utilizing a standardized USB interface as a connector within the built-in input unit; and connecting and disconnecting a keyboard from the standardized USB interface without turning off power to the external information processing apparatus.

7. The information processing method according to claim 5, further comprising:

the built-in display unit and the built-in input unit serving as the display unit and the input unit for both the information processing apparatus as well as the external information processing apparatus, thereby eliminating a requirement for the external information processing apparatus to have a separate permanent display unit and separate permanent input unit.

8. The information processing method according to claim 7, further comprising:

the built-in display unit and the built-in input unit both having connectors, which are physically combined within a single connector.

9. The information processing method according to claim 5, further comprising:

utilizing a frame buffer to assist in converting a scanning screen to a size suitable for display on the built-in display unit.

10. The information processing method according to claim 5, wherein:

the built-in input unit comprises a single keyboard which is an only keyboard of the information processing apparatus and the external information processing apparatus.

11. The information processing method according to claim 5, wherein:

the built-in display unit and the built-in input unit are used by the external information processing apparatus and the external information processing apparatus operates without a separate permanent display, and without a separate and permanent input unit.

12. An information processing system comprising an external information processing apparatus and an information processing apparatus, the external information processing apparatus including a display signal output means for outputting a display signal, the information processing apparatus including:

a core processing unit;

a built-in display unit configured to display a display signal supplied from the core processing unit;

a built-in input unit configured to generate an input signal responsive to a user operation for provision to the core processing unit;

a display signal input means for receiving the display signal from the display signal output means of the external information processing apparatus for provision to the display unit; and an output means for selectively outputting the input signal received from the built-in input unit to the external information processing apparatus and to the information processing apparatus;

wherein the display signal received from the external information processing apparatus is combined, by a means for combining, with the display signal supplied from the core processing unit and displayed in a part of a screen of the display unit displaying the signal supplied from the core processing unit, the information processing apparatus further comprising:

means for determining whether the part of the screen of the display unit of the information processing apparatus displaying the display signal received from the external information processing apparatus is activated or inactivated, wherein the core processing unit causes the output means to output the input signal received from the input unit only to the external information processing apparatus in response to the means for determining whether the part of the screen is activated.

* * * * *